(12) United States Patent
Takeda

(10) Patent No.: US 7,806,385 B2
(45) Date of Patent: Oct. 5, 2010

(54) INDUSTRIAL ROBOT HAVING A SUSPENDED UNIT

(75) Inventor: Shigeru Takeda, Okazaki (JP)

(73) Assignee: Denso Wave Incorporated, Tokyo (JP)

(*) Notice: Subject to any disclaimer, the term of this patent is extended or adjusted under 35 U.S.C. 154(b) by 0 days.

(21) Appl. No.: 12/292,113

(22) Filed: Nov. 12, 2008

(65) Prior Publication Data

US 2009/0127530 A1 May 21, 2009

(30) Foreign Application Priority Data

Nov. 15, 2007 (JP) ............................ 2007-296801

(51) Int. Cl.
*B66D 1/36* (2006.01)
(52) U.S. Cl. .................. 254/325; 248/326; 248/333; 248/343
(58) Field of Classification Search ................. 254/230, 254/325; 248/326, 333, 343
See application file for complete search history.

(56) References Cited

U.S. PATENT DOCUMENTS

| 3,373,285 A | * | 3/1968 | Barrett | 378/194 |
| 3,822,051 A | * | 7/1974 | Karapita | 248/333 |
| 3,986,697 A | * | 10/1976 | Amor et al. | 248/333 |
| 4,677,273 A | * | 6/1987 | Colegrove et al. | 219/121.13 |
| 6,089,518 A | * | 7/2000 | Nilsson | 248/317 |
| 6,443,702 B1 | * | 9/2002 | Ross | 416/246 |
| 6,568,836 B2 | * | 5/2003 | Wahl | 362/404 |
| 6,573,451 B2 | | 6/2003 | Komiya et al. | |
| 6,659,415 B2 | * | 12/2003 | Kummerfeld et al. | 248/343 |
| 6,817,585 B2 | * | 11/2004 | Wagner et al. | 248/324 |
| 7,150,449 B1 | * | 12/2006 | Dueck et al. | 254/278 |
| 7,523,919 B2 | * | 4/2009 | Hanlon | 254/278 |
| 2002/0194792 A1 | * | 12/2002 | Feldpausch et al. | 52/36.1 |
| 2007/0139812 A1 | * | 6/2007 | Minemura | 360/92 |

FOREIGN PATENT DOCUMENTS

JP   A-2000-161447   6/2000
JP   A-2003-83473   3/2003

* cited by examiner

*Primary Examiner*—Emmanuel M Marcelo
(74) *Attorney, Agent, or Firm*—Oliff & Berridge, PLC

(57) ABSTRACT

The Cableveyor may be able to support its own weight in the direction of gravity since the Cableveyor having the bent portion that connects between the straight-moving unit and the rotating unit is arranged so that it bends in a horizontal plane. As a result, the Cableveyor and the maintenance member do not collide, thus collision noise or dust caused by the collision can be suppressed. Moreover, since the Cableveyor is arranged to the side of the straight axis, the height size of the robot can be suppressed compared with the composition that arranges the Cableveyor on the upper surface of the straight axis.

4 Claims, 8 Drawing Sheets

INDUSTRIAL ROBOT HAVING A SUSPENDED UNIT

CROSS-REFERENCE TO RELATED APPLICATION

This application is based on and claims the benefit of priority from earlier Japanese Patent Application No. 2007-296801 filed on Nov. 15, 2007, the description of which is incorporated herein by reference,

BACKGROUND OF THE INVENTION

1. Technical Field of the Invention

This invention relates to an industrial robot that suspends a suspended unit movably in a straight line on a straight axis that is fixed on a stationary part.

2. Description of the Related Art

In the case where an industrial robot is introduced into a small installation, a perpendicularly intersected type industrial robot is used. This type of the industrial robot has two straight-moving axes that are perpendicularly intersected. In order to supply signal wires and power supply lines to movable parts disposed on the straight-moving axes, the wires and lines are passed through in a cable supporting means.

The cable supporting means is arranged so that its bending direction is perpendicular to the supporting surface of the cable supporting means as disclosed in Japanese Patent Application Laid-Open Publications No. 2003-83473 and No. 2000-161447, for example.

For this reason, noise and dust occurs when a suspended unit moves because of an occurrence of a collision by a weight of the cable supporting means acting in the direction of gravity and a movement force of the cable supporting means existing above the suspended unit that moves towards the supporting surface side of the cable supporting means.

SUMMARY OF THE INVENTION

The present invention has been made in order to solve the issue described above, and has as its object to provide an industrial robot having a suspended unit that can suppress the occurrence of noise and dust from the cable supporting means when the suspended unit moves.

In the industrial robot having a suspended unit according to a first aspect, there is provided an industrial robot having a suspended unit comprising a straight axis fixed on a stationary part, a suspended unit suspended movably in a straight line on the straight axis, and a cable supporting means having a bent portion with a curved surface located on a side of the straight axis which connects between the straight axis and the suspended unit.

In addition, the cable supporting means extends in the direction parallel to the longitudinal direction of the straight axis at the side of the straight axis.

Since the cable supporting means is arranged so that the bending direction becomes parallel to the longitudinal direction of the straight axis, the cable supporting means may be able to support its own weight in the direction of gravity.

As a result, the cable supporting means always touches a supporting surface of the maintenance member and moves according to a movement of the suspended unit regardless of a movement or a present position of the suspended unit, a collision does not occur, and the noise and the dust accompanying the collision can be suppressed.

In the industrial robot having a suspended unit according to a second aspect, the cable supporting means is arranged at a lower position than an upper most position of the robot.

In the industrial robot having a suspended unit according to a third aspect, the suspended unit is provided with an elevating part, and the cable supporting means is located in the higher position than the upper most position of the elevated elevating part.

DETAILED DESCRIPTION OF THE PREFERRED EMBODIMENTS

With reference to the accompanying drawings, hereinafter will be described a first embodiment of the present invention.

Figure 1:
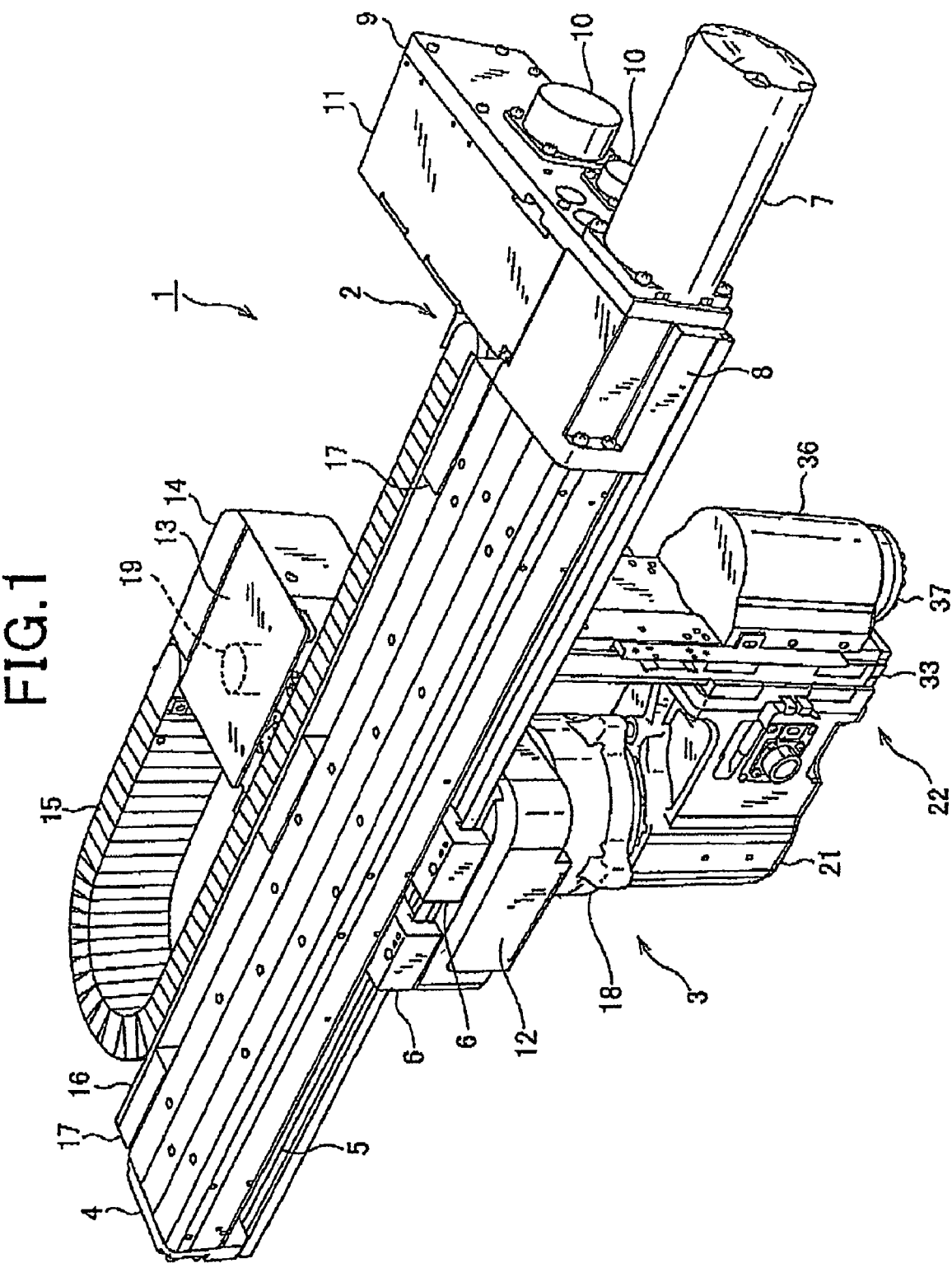
FIG. 1 shows a perspective diagram of an industrial robot having a suspended unit in an embodiment of the present invention.
Figure 2:
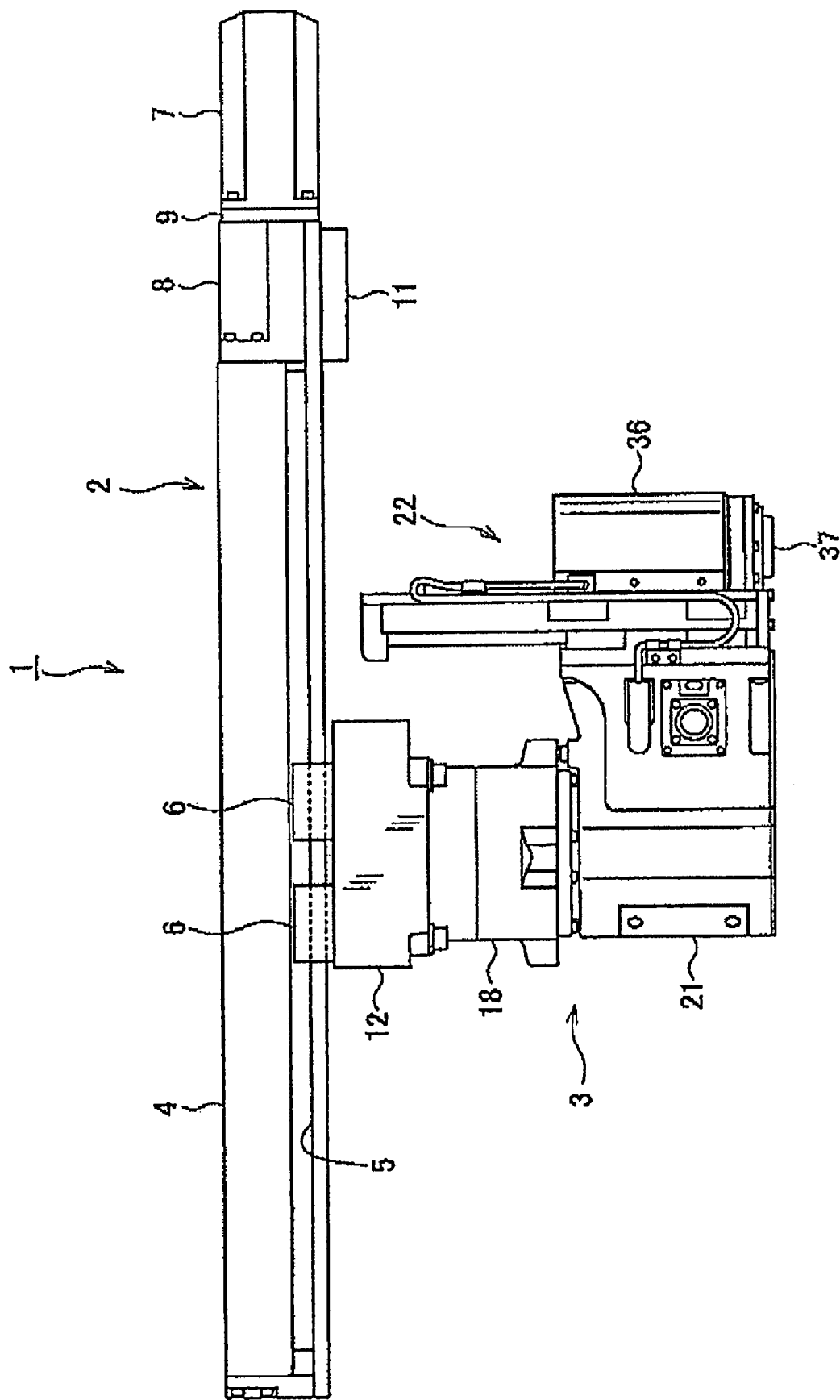
FIG. 2 shows an elevational view of the industrial robot.
Figure 3:
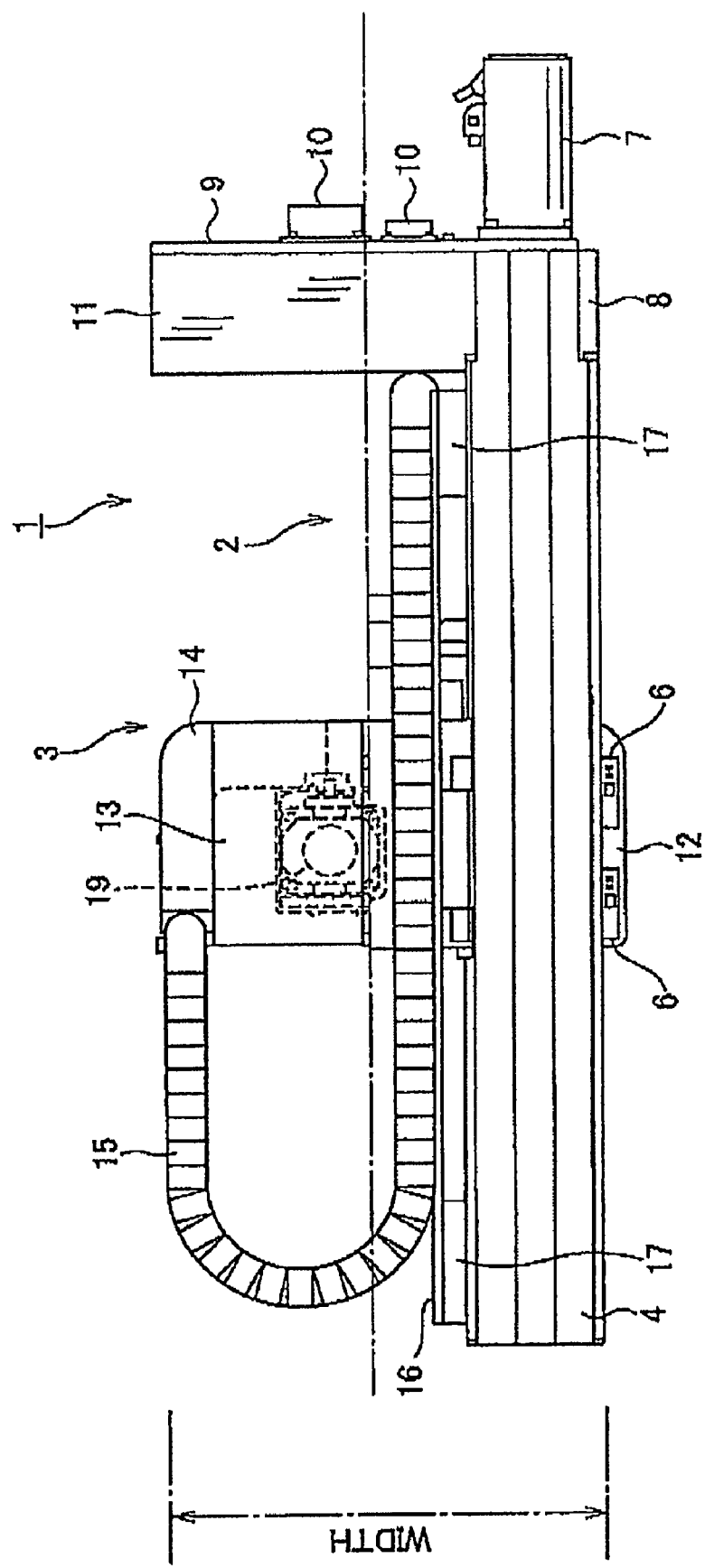
FIG. 3 shows an upper surface view of the industrial robot.

FIG. 1 shows a perspective diagram of an industrial robot having a suspended unit, FIG. 2 shows an elevational view of the industrial robot, and FIG. 3 shows an upper surface view of the industrial robot.

By the way, illustrations of cables, compressed air pipes, etc. are omitted in these FIGS. 1, 2, and 3.

The industrial robot 1 comprises a rotating unit (equivalent to a suspended unit) 3 suspended movably in a straight line from the straight-moving unit 2. The industrial robot 1 is installed in a lo predetermined workspace (not shown) by fixing it to a ceiling (not shown, equivalent to a stationary part) or to a leg part (not shown, equivalent to a stationary part), for example. The industrial robot 1 may be fixed horizontally, vertically or in any direction; however, the industrial robot 1 in this embodiment is fixed horizontally.

The straight-moving unit 2 is constituted mainly with a straight axis 4. A guide rail 5 is formed in the straight axis 4 along its longitudinal direction, and it is equipped with a pair of sliders 6 movably in a straight line along with the guide rail 5. The straight axis 4 is provided with a ball screw (not shown), and the ball screw is screwed to a nut (not shown) that is fixed to the sliders 6. The ball screw is designed to rotate in the state where its rotation is slowed down by a connecting unit 8 by a motor for straight-moving axes 7 (simplified to "motor" hereafter). The sliders 6 move in a straight line with the rotation of the motor 7 along with the guide rail 5.

The motor 7 is fixed to the connecting unit 8 via a base member 9. The base member 9 is horizontally projected from the straight axis 4, and there is provided a box connector 10 on one side of the projected part. There is provided a box 11 on another side of the base member 9 so that a box 11 may become horizontal, and not shown cables (power cables, signal cables) and compressed air tubes are introduced in the box 11 through the box connector 10. A suspension base 12 is engaged with an undersurface of the sliders 6, and the rotating unit 3 is fixed to the suspension base 12.

Figure 4:
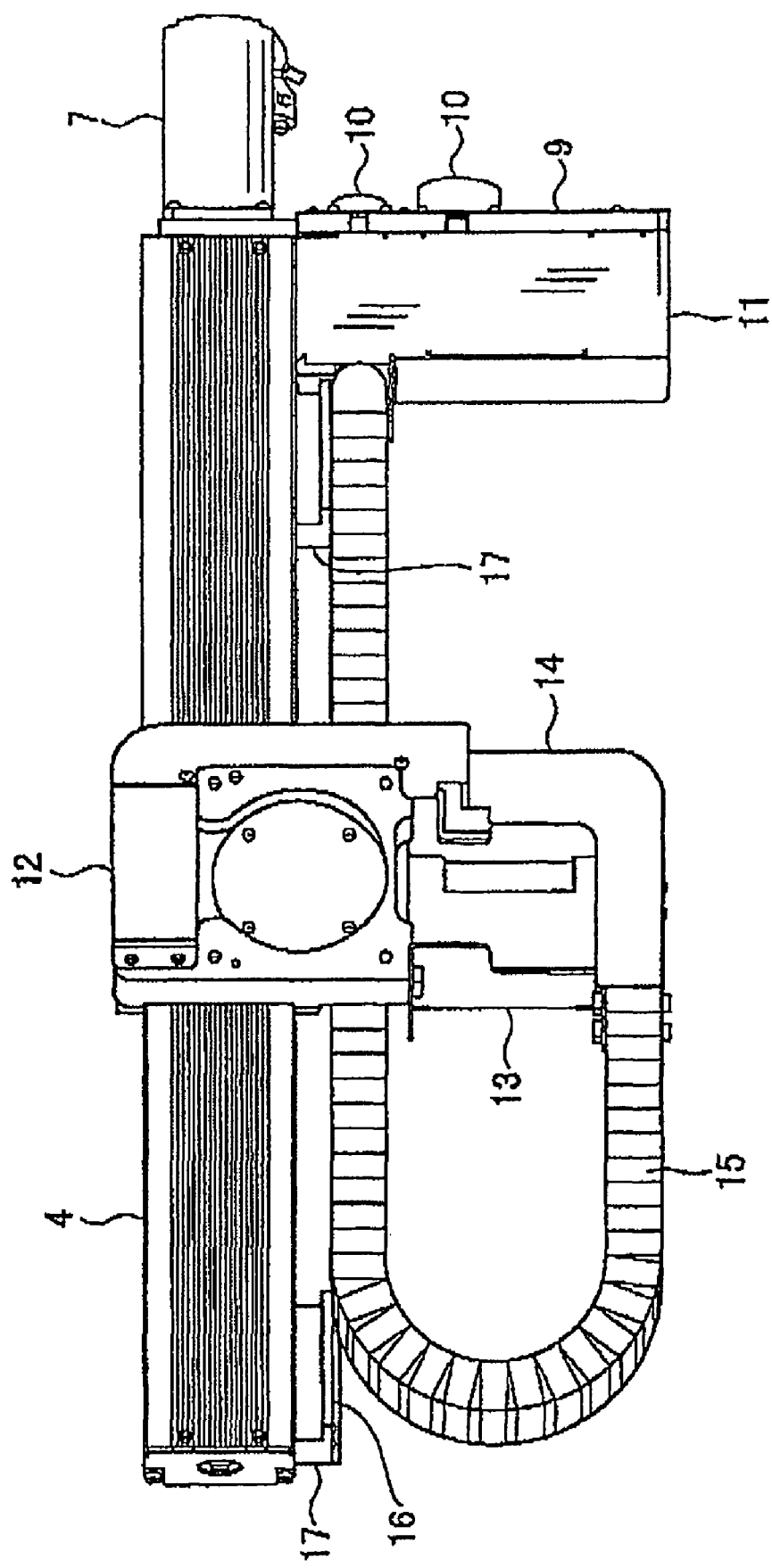
FIG. 4 shows an undersurface side perspective diagram of the industrial robot with a rotating unit removed.

FIG. 4 is a perspective diagram showing an undersurface of the industrial robot 1, and rotating unit 3 is removed for an easy explanation. The suspension base 12 is a member to which the rotating unit 3 is screwed on, and a cover member 13 and an L-shaped cable duct are formed on the side of the suspension base 12 integrately.

An end of a Cableveyor (registered trademark) 15 as a cable supporting means is connected to the box 11, and the Cableveyor 15 is extended to the direction parallel to the longitudinal direction of the straight axis 4 along with the straight axis 4 (i.e., to the horizontal direction). The Cableveyor 15 has a bent portion with a curved surface and connected to the box 11 between the straight-moving unit 2 and the rotating units 3 in the state where the bending direction is parallel to the longitudinal direction of the straight axis 4 (i.e., to the horizontal direction).

A long plate-like maintenance member 16 is fixed to the side of the straight axis 4 via the spacer 17 along with the longitudinal direction of the straight axis 4, and the Cableveyor 15 installed in accordance with the side of the straight axis 4 from the box 11 is touching along with the maintenance member 16.

The Cableveyor 15 is connected to the cable duct 14 with its intermediate part being bent back to the direction parallel to the longitudinal direction of the straight axis 4 (i.e., to the horizontal direction).

The straight-moving unit 2 is constituted as mentioned above, so and the rotating unit 3 is fixed to the suspension base 12 that constitutes the straight-moving unit 2. The cables and compressed air tubes that pass through in the Cableveyor 15 and the cable duct 14 are connected with the rotating unit 3. Here, the Cableveyor 15 is arranged so that it may become lower than the upper most position of the industrial robot 1 (when the industrial robot 1 is fixed horizontally as shown in this embodiment).

Figure 5:
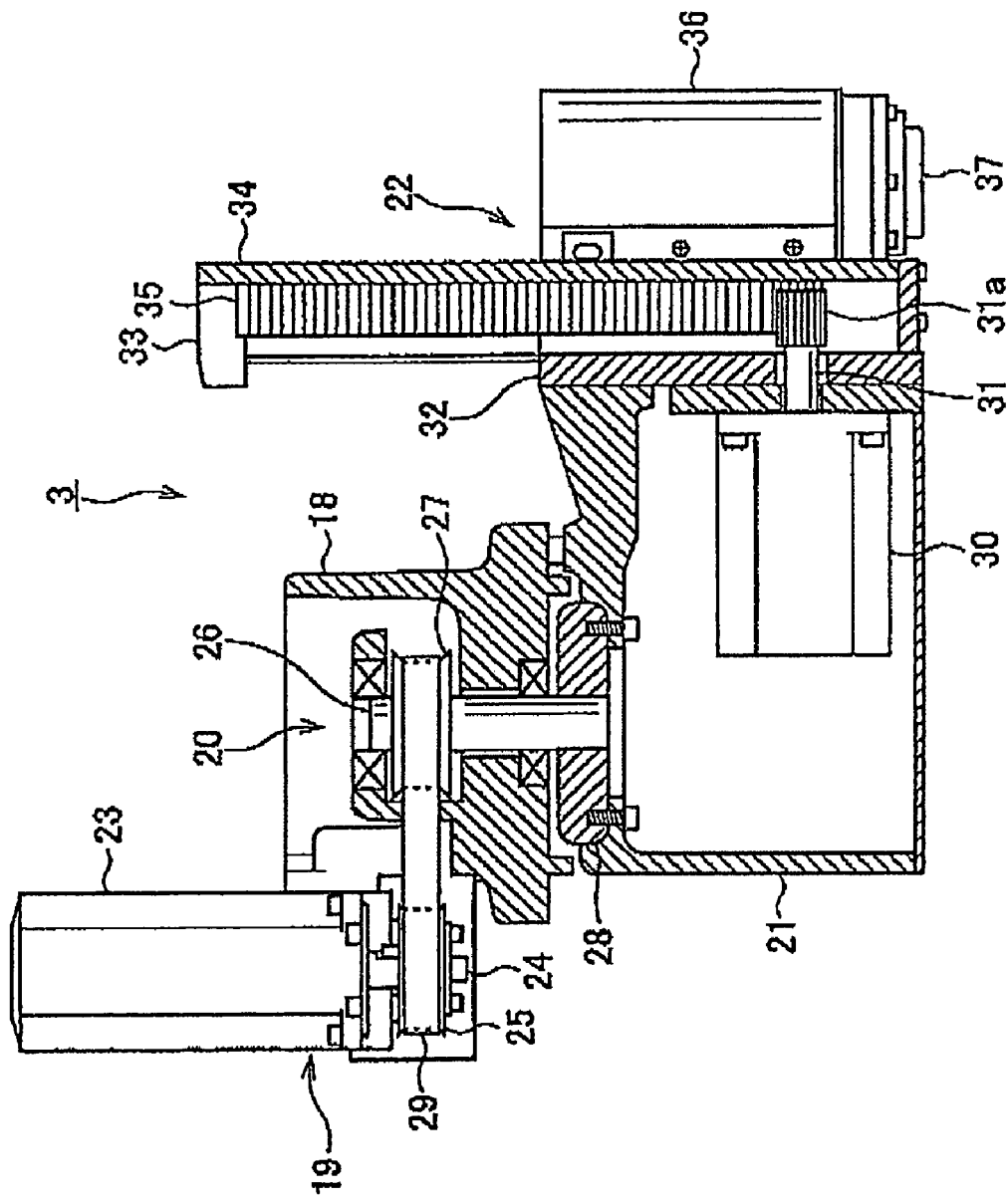
FIG. 5 is a longitudinal sectional view showing the typical structure of the rotating unit.

FIG. 5 is a longitudinal sectional view showing the typical structure of the rotating unit 3. The rotating unit 3 comprises a support part 18, a drive part (equivalent to a drive source) 19, a driven part 20, a rotation arm (equivalent to a movable member) 21, and an elevating part 22. The drive part 19 is installed in the side of the support part 18 side by side, and the driven part 20 is supported rotatably by the support part 18.

The drive part 19 is constituted with a drive pulley 25 attached to a shaft 24 of a rotation motor 23. The driven part 20 is constituted with a driven pulley 27 fixed to the upper end of a shaft 26 supported rotatably by the support part 18 and a revolving member 28 fixed to the lower end of the shaft 26.

The drive pulley 25 and the driven pulley 27 are connected with a drive belt 29, so that the rotation motor 23 rotates the revolving member 28. In this case, the drive part 19 is in a form that its head portion is located in the side of the straight axis 4, and is contained in the cover member 13.

The rotation arm 21 is fixed to the revolving member 28 of the driven part 20. Therefore, the rotation arm 21 revolves so that the rotation arm 21 may become parallel to the longitudinal direction of the straight axis 4 (i.e., to the horizontal direction) with the rotation of the rotation motor 23. There is provided an elevation motor 30 in the rotation arm 21. A pinion gear 31a is disposed at a tip of a shaft 31 of the elevation motor 30.

The elevating part 22 is fixed at a tip of the rotation arm 21. The elevating part 22 comprises a base member 32, a main slider 33 and an accompanying slider 34, and these components are connected each other in a so-called telescopic mechanism. A rack 35 is fixed to the accompanying slider 34, and the pinion gear 31a of the elevation motor 30 is engaged with the rack 35.

The accompanying slider 34 is equipped with another rotation motor 36, and a flange 37 rotates by the rotation motor 36. The flange 37 is designed to equip a grasping device, which is not shown here. In the case where the grasping device equipped on the flange 37 is operated by compressed air, the air is supplied to the grasping device through the compressed air tubes passing inside the Cableveyor 15 according to a movement of a solenoid valve (not shown) for supplying the pressured air to the grasping device.

Figure 6:
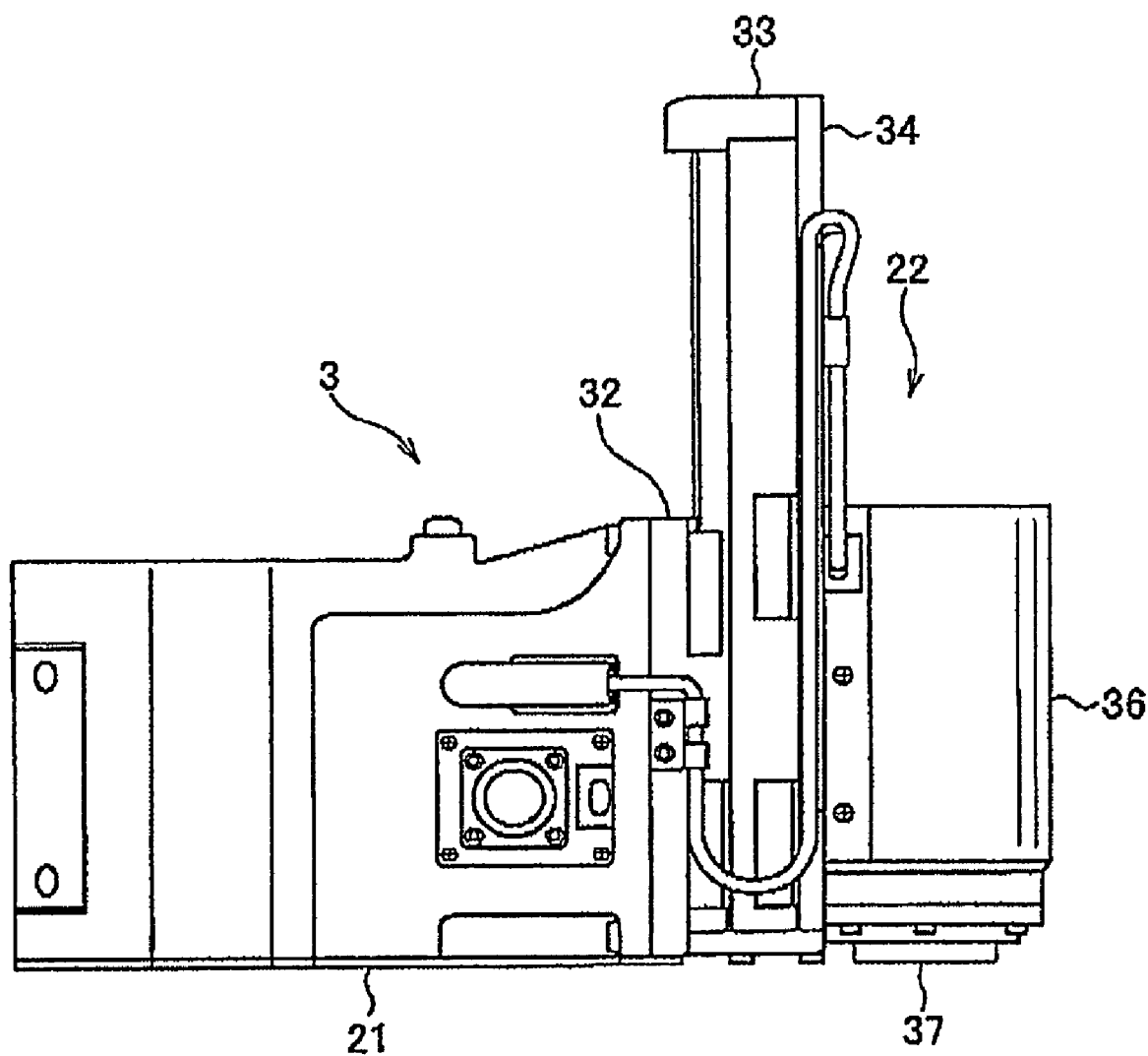
FIG. 6 is a side view of the unit where an elevating part is located in the upper most position.

The main slider 33 and the accompanying slider 34 elevate according to the drive force of the elevation motor 30. That is, in the state where the main slider 33 and the accompanying slider 34 are located in the upper most position, as shown in FIG. 6, the accompanying slider 34 equipped with the rack 35 will descend by rotating the elevation motor 30. In this case, the main slider 33 descends together with the accompanying slider 34 integrately in accordance with the descending of the accompanying slider 34.

Figure 7:
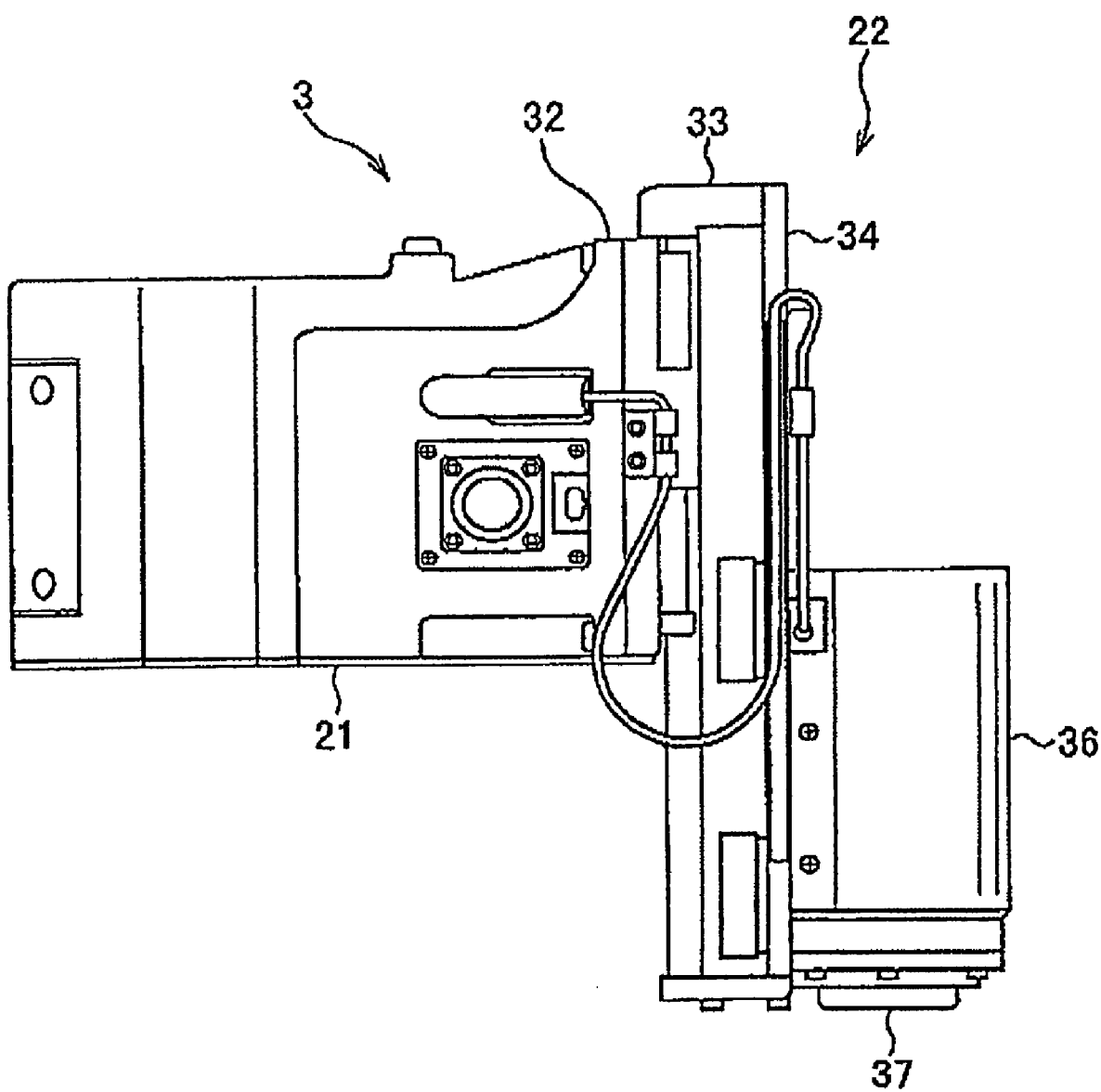
FIG. 7 is a side view of the unit where the elevating part is located in the middle position.
Figure 8:
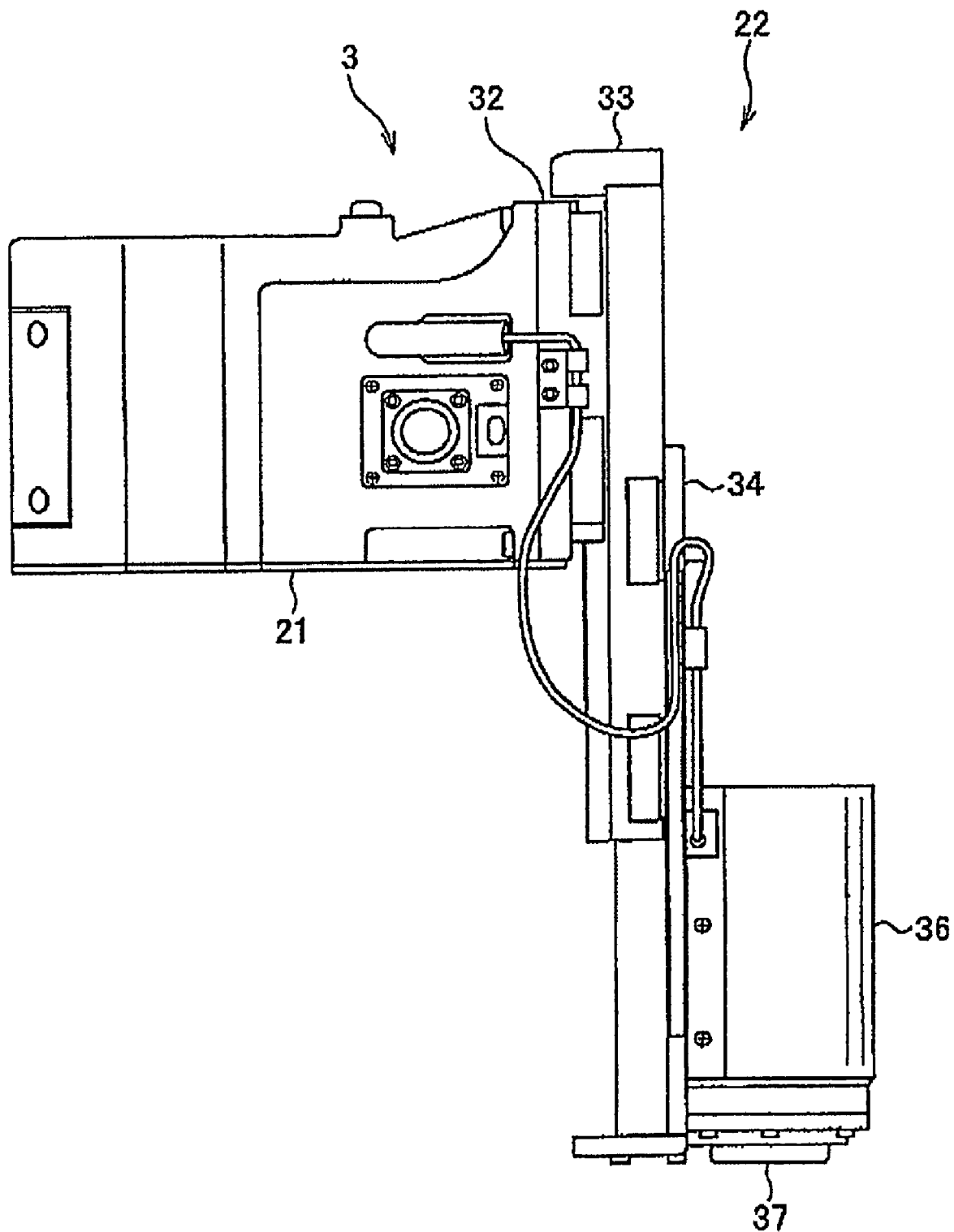
FIG. 8 is a side view of the unit where the elevating part is located in the lower most position.

As shown in FIG. 7, when the main slider 33 descends 100 mm, the base member 32 will suppress the descent of the main slider 33, thus only the accompanying slider 34 descends. As shown in FIG. 8, when the accompanying slider 34 further descends 100 mm more and is located in the lower most position, the main slider 33 will suppress the descent of the accompanying slider 34.

If the elevation motor 30 is rotated in the opposite direction in the state shown in FIG. 8, the accompanying slider 34 will elevate and at the position where the accompanying slider 34 touches the main slider 33, the accompanying slider 34 and the main slider 33 will elevate integrately.

The above-mentioned separate motors 7, 23, 30 and 36, and the solenoid valve for supplying pressured air are controlled by a robot controller (not shown).

In the industrial robot 1 constituted as mentioned above, the drive part 19 is located in the inner side of the bent portion of the Cableveyor 15 at the side of the straight-moving unit 2.

Further, the rotating unit 3 is disposed offset from the axial center of the straight axis 4 so that the center of revolution of the rotation arm 21 may be located at approximately the center of the industrial robot 1 in its width direction.

That is, as shown in FIG. 3, since the width of the industrial robot 1 is set between an end surface of the straight axis 4 and another end surface of the box 11, the center of revolution of the rotating unit 3 is located at approximately the center point of the straight axis 4 and the end surface of the box 11.

Further, the Cableveyor 15 is arranged at a higher position than the elevating part 22 where the elevating part 22 is located in the upper most position.

Now, if the motor 7 (for straight-moving axes) rotates according to the instructions From the robot controller, the rotating unit 3 moves in the straight-line movement in accordance with the straight-line movement of the sliders 6.

At this time, since the end of the Cableveyor 15 connected with the cable duct 14 of the suspension base 12 moves in accordance with the movement of the rotating unit 3, a shape of the bent portion of the Cableveyor 15 changes.

Here, in the present embodiment, since the Cableveyor 15 is arranged so that it bends in a horizontal plane, and receives the weight of its own in the gravity direction by itself, the Cableveyor 15 and the maintenance member 16 do not collide even if the shape of the bent portion of the Cableveyor 15 changes as mentioned above.

According to the above-mentioned embodiment, the Cableveyor 15 may be able to support its own weight in the direction of gravity since the Cableveyor 15 having the bent portion that connects between the straight-moving unit 2 and the rotating unit 3 is arranged so that the bending direction becomes horizontal.

As a result, the Cableveyor 15 and the maintenance member 16 do not collide, thus the collision noise or the dust caused by the collision can be suppressed.

Moreover, since the Cableveyor 15 is arranged in the side of the straight axis 4, the height size of the robot 1 can be suppressed compared with the composition that arranges the Cableveyor 15 on the upper surface of the straight axis 4.

In addition, since the Cableveyor 15 is arranged in a lower position than the upper most position of the robot 1, the Cableveyor 15 does not exceed the upper most position of the robot 1, thus the height of the robot 1 is not restricted by the Cableveyor 15.

Further, since the Cableveyor 15 does not intersect with the elevating part 22 when the Cableveyor 15 is located in the higher position than the upper most position of the elevated elevating part 22, the rotating range of the rotating unit 3 is not restricted by the Cableveyor 15.

The present invention is not limited to the revolution unit 3, but the present invention can be applied to any suspended unit that is suspended on a straight axis with a straight line movement.

What is claimed is:

1. An industrial robot having a suspended unit comprising:
a straight axis fixed on a stationary part;
a suspended unit suspended movably in a straight line on the straight axis; and
a cable supporting means having a bent portion with a curved surface located on a side of the straight axis which connects between the straight axis and the suspended unit;
wherein the cable supporting means is extended to a direction parallel to the longitudinal direction of the straight axis at the side of the straight axis.

2. An industrial robot having a suspended unit of claim 1, the cable supporting means is arranged at a lower position than an upper most position of the robot.

3. An industrial robot having a suspended unit of claim 2, the suspended unit is provided with an elevating part, and the cable supporting means is located in a higher position than an upper most position of the elevated elevating part.

4. An industrial robot having a suspended unit of claim 1, the suspended unit is provided with an elevating part, and the cable supporting means is located in a higher position than an upper most position of the elevated elevating part.

* * * * *